US011059593B2

(12) United States Patent
Fagundes et al.

(10) Patent No.: US 11,059,593 B2
(45) Date of Patent: Jul. 13, 2021

(54) AIRFLOW MANAGEMENT IN CABIN OF AIRCRAFT

(71) Applicant: BOMBARDIER INC., Dorval (CA)

(72) Inventors: Sandro A. S. Fagundes, Pointe-Claire (CA); Boris Meislitzer, Pointe-Claire (CA); Keith Ayre, Montreal (CA)

(73) Assignee: BOMBARDIER INC., Dorval (CA)

( * ) Notice: Subject to any disclaimer, the term of this patent is extended or adjusted under 35 U.S.C. 154(b) by 433 days.

(21) Appl. No.: 15/575,411

(22) PCT Filed: May 16, 2016

(86) PCT No.: PCT/IB2016/052832
§ 371 (c)(1),
(2) Date: Nov. 20, 2017

(87) PCT Pub. No.: WO2016/189421
PCT Pub. Date: Dec. 1, 2016

(65) Prior Publication Data
US 2018/0148182 A1 May 31, 2018

Related U.S. Application Data

(60) Provisional application No. 62/165,294, filed on May 22, 2015.

(51) Int. Cl.
*B64D 13/08* (2006.01)
*B64D 13/06* (2006.01)
*B64D 13/04* (2006.01)

(52) U.S. Cl.
CPC ............. *B64D 13/08* (2013.01); *B64D 13/04* (2013.01); *B64D 13/06* (2013.01);
(Continued)

(58) Field of Classification Search
CPC ........ B64D 13/08; B64D 13/04; B64D 13/06; B64D 2013/0618; B64D 2013/0688; Y02T 50/54; Y02T 50/56
See application file for complete search history.

(56) References Cited

U.S. PATENT DOCUMENTS 4,733,605 A 3/1988 Holter et al.
5,462,485 A 10/1995 Kinkead
(Continued)

FOREIGN PATENT DOCUMENTS

WO 2014072619 A1 5/2014
WO 2015055672 A1 4/2015

OTHER PUBLICATIONS

China National Intellectual Property Administration, Notification of First Office Action dated Dec. 11, 2019 re: Application No. 201680029423.3.
(Continued)

*Primary Examiner* — Thomas G Black
*Assistant Examiner* — Tarek Elarabi
(74) *Attorney, Agent, or Firm* — Norton Rose Fulbright Canada LLP

(57) ABSTRACT

Cabin air is managed in the aircraft as a function of the minimum requirements for defined air quality needs, temperature control needs, and cabin pressurization needs. Airflow may be varied dynamically as a function of aircraft or cabin altitude, and the minimum requirements for airflow may be determined in real time so as to dynamically set an airflow schedule.

20 Claims, 10 Drawing Sheets

(52) U.S. Cl.
CPC ............. *B64D 2013/0618* (2013.01); *B64D 2013/0688* (2013.01); *Y02T 50/50* (2013.01)

(56) References Cited

U.S. PATENT DOCUMENTS

| | | | |
|---|---|---|---|
| 5,695,396 | A | 12/1997 | Markwart et al. |
| 5,742,516 | A | 4/1998 | Olcerst |
| 5,750,999 | A | 5/1998 | Fox |
| 5,791,982 | A | 8/1998 | Curry et al. |
| 6,449,963 | B1 | 9/2002 | Ng et al. |
| 6,503,462 | B1 * | 1/2003 | Michalakos ....... B01D 53/8643 422/173 |
| 6,711,470 | B1 | 3/2004 | Hartenstein et al. |
| 6,817,576 | B2 | 11/2004 | Brady et al. |
| 6,941,806 | B2 | 9/2005 | Burns et al. |
| 7,837,541 | B2 | 11/2010 | Gray et al. |
| 7,857,892 | B2 | 12/2010 | Marra |
| 8,092,285 | B2 | 1/2012 | Mathur et al. |
| 8,206,475 | B2 | 6/2012 | Walkinshaw |
| 8,452,489 | B2 | 5/2013 | Marra |
| 8,560,146 | B2 | 10/2013 | Kwon et al. |
| 8,636,003 | B2 | 1/2014 | Deutscher et al. |
| 8,674,842 | B2 | 3/2014 | Zishaan |
| 8,733,355 | B2 | 5/2014 | Turiello |
| 8,840,841 | B2 | 9/2014 | Roberts |
| 10,571,316 | B2 * | 2/2020 | Gaully ................. G01F 1/34 |
| 2008/0283663 | A1 | 11/2008 | Space et al. |
| 2010/0203818 | A1 * | 8/2010 | Gray ................. B64D 13/04 454/74 |
| 2011/0046822 | A1 * | 2/2011 | Gray ................. B64D 13/04 701/3 |
| 2012/0068862 | A1 | 3/2012 | Tillotson |
| 2012/0117974 | A1 | 5/2012 | Hilgeman et al. |
| 2013/0030718 | A1 | 1/2013 | Williams et al. |
| 2013/0231035 | A1 * | 9/2013 | Desmarais ........... B64D 13/006 454/75 |
| 2014/0323026 | A1 | 10/2014 | Lewis et al. |
| 2015/0099444 | A1 | 4/2015 | Le et al. |
| 2015/0268073 | A1 | 9/2015 | Gaully et al. |
| 2016/0214723 | A1 | 7/2016 | Fox et al. |
| 2016/0214724 | A1 | 7/2016 | Fox et al. |

OTHER PUBLICATIONS

English translation of International patent document No. WO2015/055672 dated Apr. 23, 2015, https://patents.google.com/patent/WO2015055672A1/en?oq=WO2015%2f055672, accessed on Jan. 22, 2020.
PCT International Search Report and Written Opinion dated Aug. 9, 2016 re: International Application No. PCT/IB2016/052831.
James A. Hall Jr. et al., Monitoring Aircraft Cabin Particulate Matter Using a Wireless Sensor Network, Electrical and Computer Engineering Faculty Publications and Presentations, Jul. 14, 2013, pp. 1-17, 43rd International Conference on Environmental Systems, American Institute of Aeronautics and Astronautics, United States of America.
PCT international Search Report and Written Opinion dated Jul. 27, 2016 re: International Application No. PCT/IB2016/052832.
E. A. Timby, Airflow Rate Requirements in Passenger Aircraft, Ministry of Aviation Supply—Aeronautical Research Council, 1970, C.P. No. 1136, London: Her Majesty's Stationery Office, London.
English translation of International Publication No. WO 2014/072619A1 dated May 15, 2014, accessed on Nov. 13, 2017, https://www.google.ca/patents/WO2014072619A1?cl=en&dq=WO2014072619+(A1)&hl=en&sa=X&ved=0ahUKEwj36OHu7LvXAhXr5oMKHVBcCXsQ6AEIKDAA.

* cited by examiner ated with US 11,059,593 B2

AIRFLOW MANAGEMENT IN CABIN OF AIRCRAFT

CROSS-REFERENCE TO RELATED APPLICATIONS

This application claims priority under 35 U.S.C. 119(e) to is a national phase application under 35 U.S.C. 371 of International Patent Application No. PCT/IB2016/052832 filed on May 16, 2016, which claims priority from U.S. application No. 62/165,294 filed May 22, 2015, entitled "Airflow Management in Cabin of Aircraft", the entire contents of which are hereby incorporated by reference.

TECHNICAL FIELD

The present invention relates to the field of aircraft air management and more particularly, to managing the airflow inside the cabin as a function of actual needs in the cabin.

BACKGROUND OF THE ART

The quality of air in the cabin/cockpit of an aircraft is controlled through a ventilation system that may be one or a combination of two or more air sources, namely bleed/compressed air and filtered recirculated air. Bleed air is fresh air taken from outside of the aircraft and compressed by an air compressor. The compressed air is cooled via air conditioning units and ducted into the cabin. Part of the air distributed in the cabin is eventually drawn into either a recirculation system and remixed with a fresh supply of bleed air for circulation back into the cabin, or it is released outside of the aircraft. Typically, a balance is struck between bleed air and recirculated air.

The quantity of fresh air required depends on the number of passengers and crew in the aircraft. It is desirable for airlines to reduce the amount of compressed air extracted from the engines, named "fresh air", as a means of cost savings and for increasing engine performance. However this can only be done while maintaining an acceptable level of air quality. Current airworthiness regulations impose a given supply of fresh air, such as 0.55/0.4 lbs/min for each occupant (for example FAR25/CS25.831). Therefore, the aircraft are not designed to allow pilots to adjust the ratio of fresh air to recirculated air in flight below above limits.

SUMMARY

In order to meet multiple requirements for sizing the air supply to all aircraft pressurized areas, cabin air is managed in the aircraft as a function of the minimum requirements for defined air quality needs, temperature control needs, and cabin pressurization needs. Airflow may be varied as a function of aircraft altitude, and the minimum requirements for airflow may be determined in real time so as to dynamically set an airflow schedule. The operational status of the air sources (e.g. availability of the air conditioning units) may also be considered to determine airflow.

In accordance with a first broad aspect, there is provided method for managing airflow in an aircraft, the method comprising obtaining a minimum airflow requirement for temperature control needs in the aircraft as a function of an altitude of the aircraft or cabin, or as a function of heating or cooling needs within the cabin; obtaining a minimum airflow requirement for a cabin pressurization needs in the aircraft as a function of the altitude of the aircraft or cabin; obtaining a minimum airflow requirement for a desired air quality for the aircraft; and setting an airflow schedule in the aircraft to be greater than or equal to a highest one of the temperature, cabin pressure, and air quality minimum airflow requirements, as a function of the altitude of the aircraft or cabin.

In some embodiments, the method further comprises determining a current altitude of the aircraft or cabin and varying the airflow in the cabin as a function of the current altitude in accordance with the airflow schedule.

In some embodiments, obtaining a minimum airflow requirement for temperature control needs may comprise obtaining a minimum airflow requirement for heating of the aircraft; and obtaining a minimum airflow requirement for cooling of the aircraft. Obtaining a minimum airflow requirement for a desired air quality may comprise determining minimum airflow requirement for air quality using an actual occupancy of the aircraft. Obtaining a minimum airflow requirement for temperature may comprise determining the temperature minimum airflow requirement using atmospheric conditions outside of the aircraft and/or thermal heating/cooling needs inside the aircraft.

In some embodiments, setting the airflow schedule comprises dynamically setting the airflow schedule using a current aircraft altitude and other parameters obtained in real time.

In some embodiments, the method further comprises monitoring an air quality in the aircraft. The method may also further comprise detecting a drop in the air quality below a threshold and triggering an alert signal indicative of the drop in air quality. The method may also further comprise modifying the airflow schedule as a function of the drop in air quality. In some embodiments, modifying the airflow schedule comprises at least one of shutting down at least one air source, shutting down a recirculation system, turning on a new air source, changing a ratio of fresh air to recirculated air distributed in the aircraft, and reducing a total air flow.

In accordance with another broad aspect, there is provided a system for managing airflow in an aircraft, the system comprising: a memory; a processor coupled to the memory; and an application stored on the memory and comprising program code executable by the processor for: obtaining a minimum airflow requirement for temperature control needs in the aircraft as a function of an altitude of the aircraft or cabin, or as a function of heating or cooling needs within the cabin; obtaining a minimum airflow requirement for a cabin pressurization needs in the aircraft as a function of the altitude of the aircraft or cabin; obtaining a minimum airflow requirement for a desired air quality for the aircraft; and setting an airflow schedule in the aircraft to be greater than or equal to a highest one of the temperature, cabin pressure, and air quality minimum airflow requirements, as a function of the altitude of the aircraft or cabin.

In some embodiments, the application further comprises program code executable by the processor for determining a current altitude of the aircraft; and varying the airflow in the cabin as a function of the current altitude in accordance with the airflow schedule.

In some embodiments, obtaining a minimum airflow requirement for temperature control needs may comprise obtaining a minimum airflow requirement for heating of the aircraft; and obtaining a minimum airflow requirement for cooling of the aircraft. Obtaining a minimum airflow requirement for a desired air quality may comprise determining minimum airflow requirement for air quality using an actual occupancy of the aircraft. Obtaining a minimum airflow requirement for temperature may comprise determining the temperature minimum airflow requirement using atmospheric conditions outside of the aircraft, and actual cabin heat loads variable according to cabin occupancy.

In some embodiments, setting the airflow schedule comprises dynamically setting the airflow schedule using a current aircraft altitude and other parameters obtained in real time.

In some embodiments, the application further comprises program code executable by the processor for monitoring an air quality in the aircraft. The application may also further comprise program code executable by the processor for detecting a drop in the air quality below a threshold and triggering an alert signal indicative of the drop in air quality. The application may also further comprise program code executable by the processor for modifying the airflow schedule as a function of the drop in air quality.

In some embodiments, modifying the airflow schedule comprises at least one of shutting down at least one air source, shutting down a recirculation system, turning on a new air source, changing a ratio of fresh air to recirculated air distributed in the aircraft, and reducing a total air flow.

BRIEF DESCRIPTION OF THE DRAWINGS

Further features and advantages of the present invention will become apparent from the following detailed description, taken in combination with the appended drawings, in which.

It will be noted that throughout the appended drawings, like features are identified by like reference numerals.

DETAILED DESCRIPTION

Figure 1:
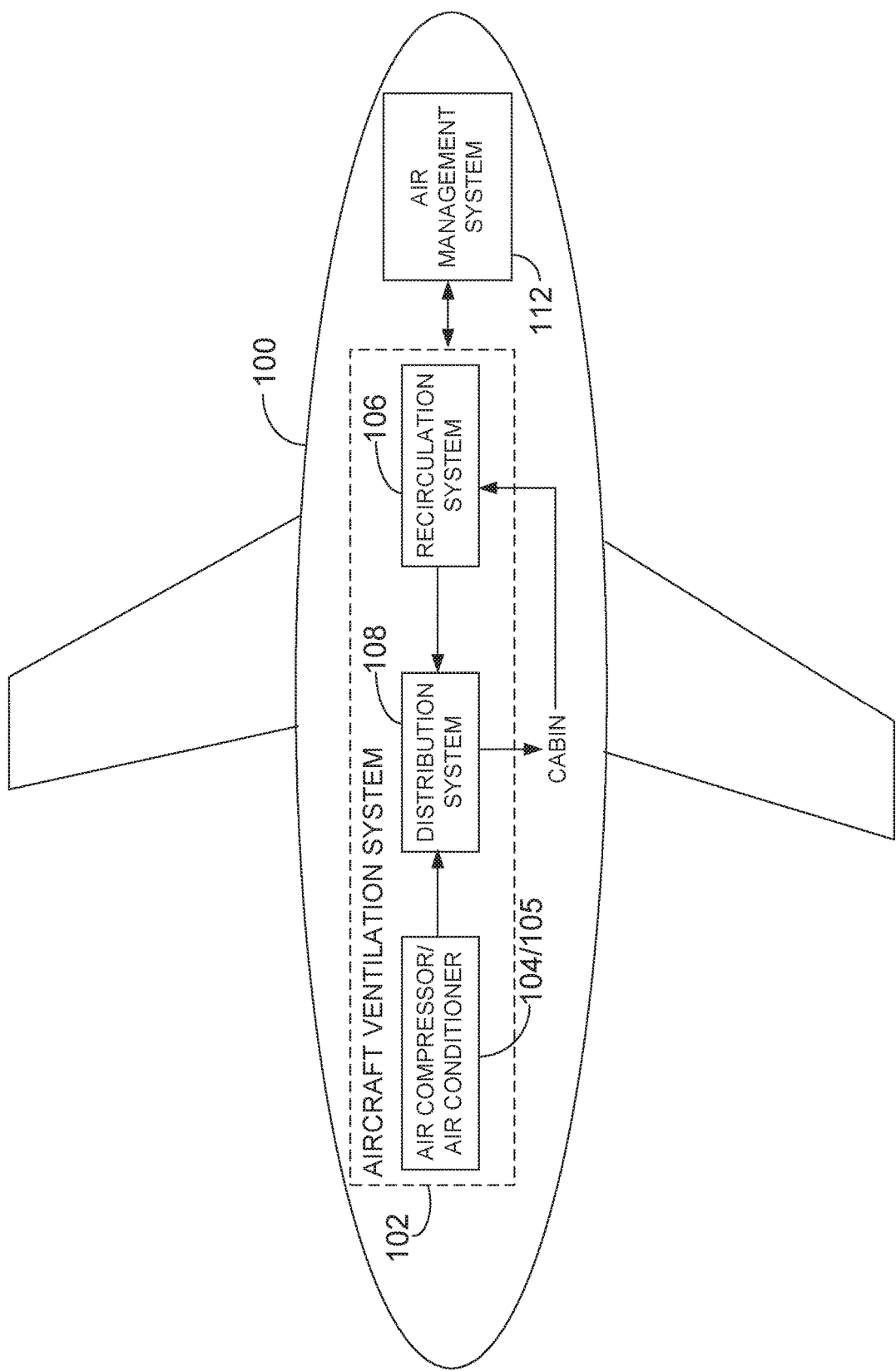
FIG. 1 illustrates an exemplary embodiment of an aircraft with an aircraft ventilation system and an air management system.

Referring to FIG. 1, there is illustrated an aircraft 100 comprising an aircraft ventilation system 102. The ventilation system 102 distributes low-pressure air throughout the interior of the aircraft 100, including a cabin, a flight deck, aircraft bays, and a cockpit. For simplicity, the interior of the aircraft 100 will be referred to herein as the cabin. Air supplied to the cabin consists mainly of outside ambient air from an air compressor 104 that is conditioned by an air conditioner 105, and filtered, recirculated air via a recirculation system 106. Note that the aircraft may or may not have a recirculation system 106. For illustrative purposes, the present description will refer to aircraft with a recirculation system 106. The air compressor 104 may comprise one or more engines which supply bleed air, i.e. compressed outside air. The air compressor 104 may also comprise one or more auxiliary power units (APU) supplying bleed air. In some embodiments, the air compressor 104 comprises a combination of engines and APU which together are used to supply bleed air for distribution into the cabin. In other embodiments (such as More Electric aircraft applications), the bleed air may be supplied via motorized motor-turbine compressors.

A distribution system 108 receives compressed air from the air compressor 104/air conditioner 105 and recirculated air from the recirculation system 106, and distributes the air in the cabin. The compressed and recirculated air may be combined using a defined or variable ratio to be determined by air quality monitoring and/or by an air management system 112, such as 50/50, 60/40, 30/70 for example, before being distributed in the cabin. The air management system 112 is connected to the aircraft ventilation system 102 for communication therewith. The air management system 112 manages the airflow inside the cabin as a function of the actual needs inside the aircraft. More particularly, an airflow schedule is set by the air management system 112 while considering minimum requirements for temperature inside the cabin, cabin pressurization needs, and defined air quality needs in the cabin.

Temperature control needs inside the cabin may be viewed as heating and cooling needs. To achieve the desired temperature in the cabin, bleed air may be passed through a pre-cooler, such as a heat exchanger, and then through an air conditioning unit (also known as "packs" for pneumatic air cycle machines) to regulate the temperature. Bleed air comes from outside of the aircraft, is subject to a compression cycle by air compressors, and may thus vary greatly in temperature and pressure, as a function of the actual atmospheric and operating conditions. For example, assuming standard temperature (ISA), at 5000 ft the external temperature is 5° C., and at 10,000 ft at the same location, the temperature changes to approximately −5° C. Temperature requirements are thus driven by what is needed in terms of performance from the air conditioning unit to allow the operational requirements of the aircraft to be met, and they are influenced by the conditions inside and outside of the aircraft. For example, cooling requirements may be very high when the aircraft is on the ground at sea level at an outside temperature of 40° C. with a beaming sun on a black aircraft fuselage. In other words, more airflow is required to allow the air conditioning unit to perform according to its settings. As the aircraft increases its altitude, the outside temperature may typically decrease and thus the cooling requirements (and therefore the required airflow) also decrease, provided other factors do not cause them to remain high, such as a large number of onboard electronics generating heat dissipation, and the body heat of occupants dissipated to the cabin ambient. Similarly, heating requirements are also influenced by factors such as outside temperature (and by extension altitude), occupancy, lighting needs, window area, fuselage insulation, etc.

Cabin pressurization needs are defined for stable pressurization control and pressurization level in the cabin, e.g. to address occupant physiological constraints and fuselage structural load limitations. They are influenced by geometrical and control conditions inside and outside of the aircraft, including air density. For example, the minimum airflow requirements to meet the desired cabin pressurization needs may be influenced by the leakage rate of the aircraft, the differential pressure inside and outside of the aircraft, the outflow valve size (for stable pressure regulation), the structure and pressurization system design and sizing based on the maximum operational altitude of the aircraft, etc. Altitude of the aircraft will also have an impact on the minimum airflow requirements for cabin pressurization.

Defined air quality needs may be set as a function of what is often referred to as "fresh air". One way to minimize air contaminants such as $CO_2$ is to dilute them with adequate fresh air, or outside ambient air. Utilization of advanced air filters, producing air equivalent to fresh air may also achieve this purpose. Certain standard organizations such as NAAQS, SAE, OSHA and Aviation Certification Authorities require or recommend a minimum amount of fresh air per person for defined spaces. For example, the minimum amount of fresh outside ambient air required currently for aircraft cabin air ventilation in normal operation is 0.55 lbs/min (CFR/CS 25.831). The total volume of delivered air is the total volume of both outside ambient air and recirculation air entering a space. The percent of outside ambient air is the % of the total volume of the total delivered air. The less outside ambient air, the better to reduce the aircraft operating costs and maximize engine performance capabilities, provided airflow requirements are met.

Figure 2A:
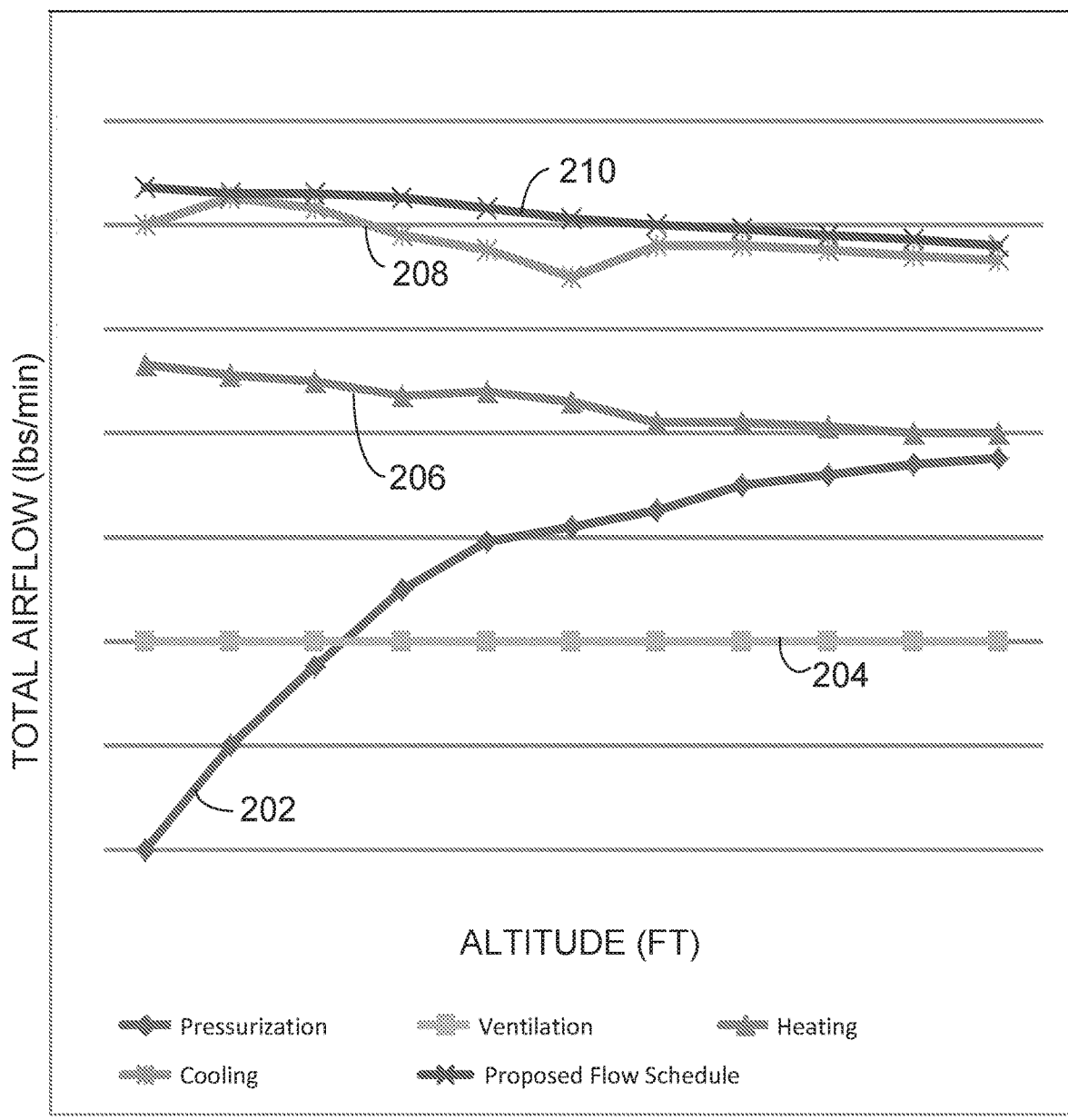
FIG. 2a illustrates a first exemplary scenario for setting an airflow schedule.

In view of the varying conditions that may impact the actual airflow needs in the cabin, setting an airflow schedule as a function of need may involve varying the total airflow in the cabin as a function of various parameters. FIG. 2a illustrates a first exemplary scenario for setting the airflow schedule in the cabin as a function of need, either regulated against aircraft altitude or cabin altitude. In the example of this graph, the minimum airflow requirements for heating 206, cooling 208, cabin pressurization 202, and air quality/ventilation 204 are illustrated as a function of altitude. Cabin pressurization flow requirements 202 are shown to be low when the aircraft is on the ground and they increase as the aircraft gains altitude. The air quality/ventilation needs 204 are constant based on maximum number of occupants, but they may be set to vary, as desired. Temperature needs are separated into heating requirements 206 and cooling requirements 208. The cooling requirements 208 in this example are shown to be higher than any of the other requirements 202, 204, 206 across the range of altitudes for the aircraft. Therefore, the overall airflow control schedule 210 is set to be greater than or equal to all airflow requirements 202, 204, 206 and 208 for all altitudes. The airflow schedule 210 may be set to have a rate of change, as illustrated in FIG. 2a, such that a change in altitude is followed by a change in airflow.

Figure 2B:
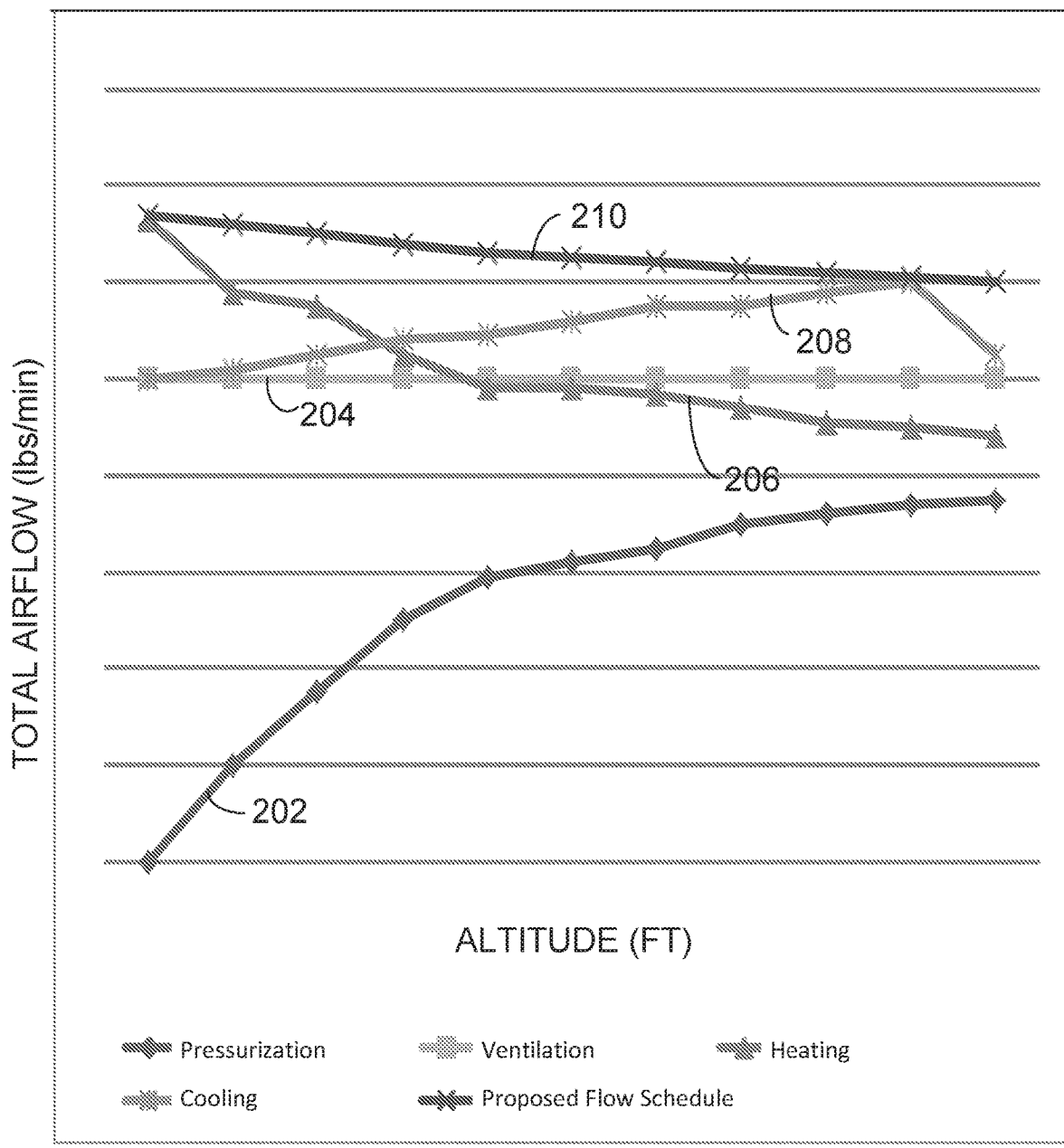
FIG. 2b illustrates a second exemplary scenario for setting an airflow schedule.
Figure 2C:
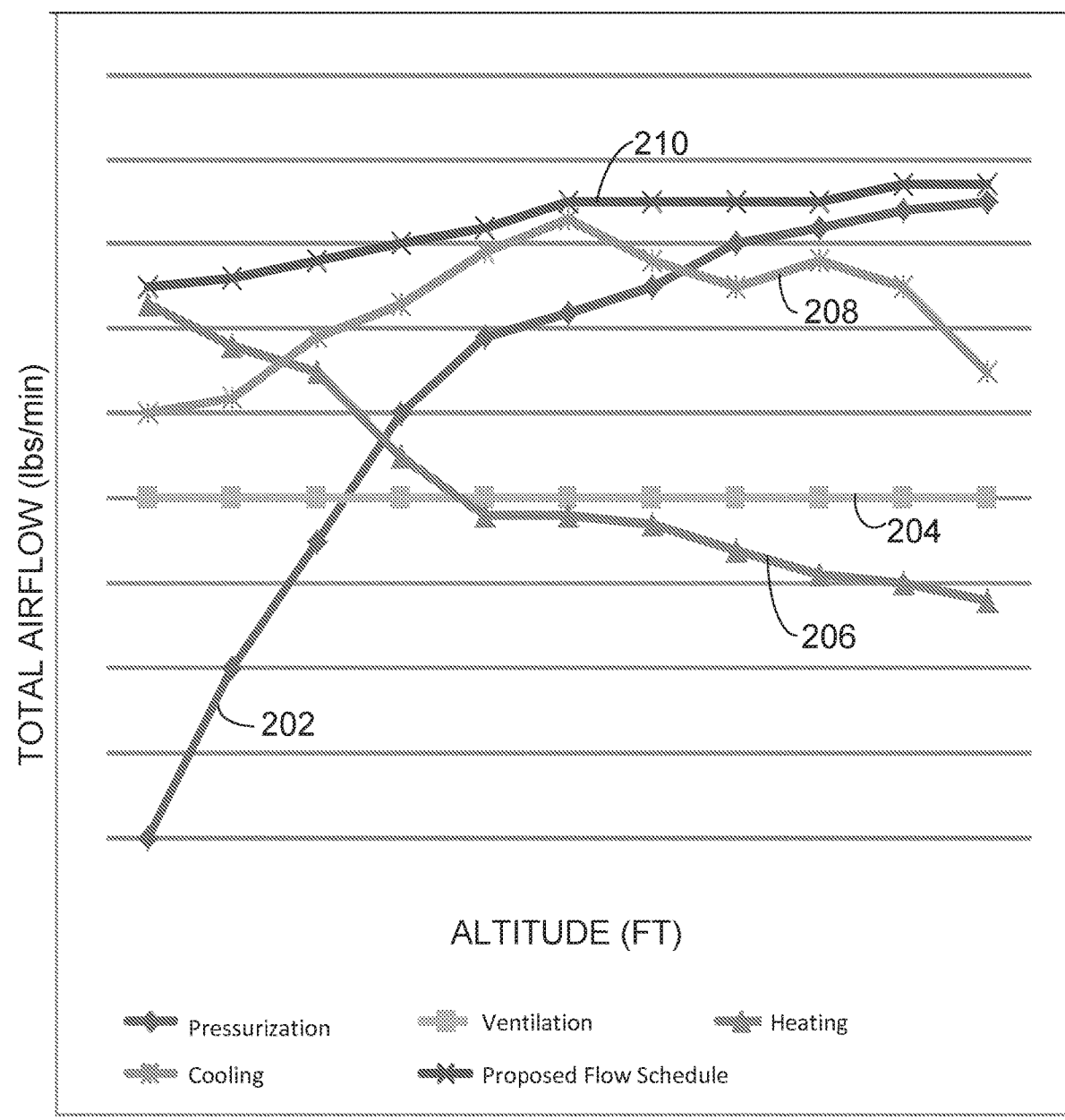
FIG. 2c illustrates a third exemplary scenario for setting an airflow schedule.

FIGS. 2b and 2c illustrate second and third exemplary scenarios for setting the airflow schedule in the cabin as a function of need. In FIG. 2b, at low altitude (i.e. when the aircraft is on the ground and after takeoff), the minimum airflow requirements for heating 206 are shown to be greater than the minimum airflow requirements for cooling 208, cabin pressurization 202, and air quality 204. Therefore, the airflow schedule 210 is set to be greater than or equal to the minimum airflow requirements for heating 206. After this initial phase, the minimum airflow requirements for cooling 208 are greater than the minimum airflow requirements for heating 206. The airflow schedule 210 is thus set to be greater than or equal to the minimum airflow requirements for cooling 208. In FIG. 2c, the highest minimum airflow requirements are successively heating 206, cooling 208, and cabin pressure 202, depending on the cabin altitude. The airflow schedule 210 is therefore set to always stay above (or equal to) the corresponding one of the requirements that is highest.

Figure 3:
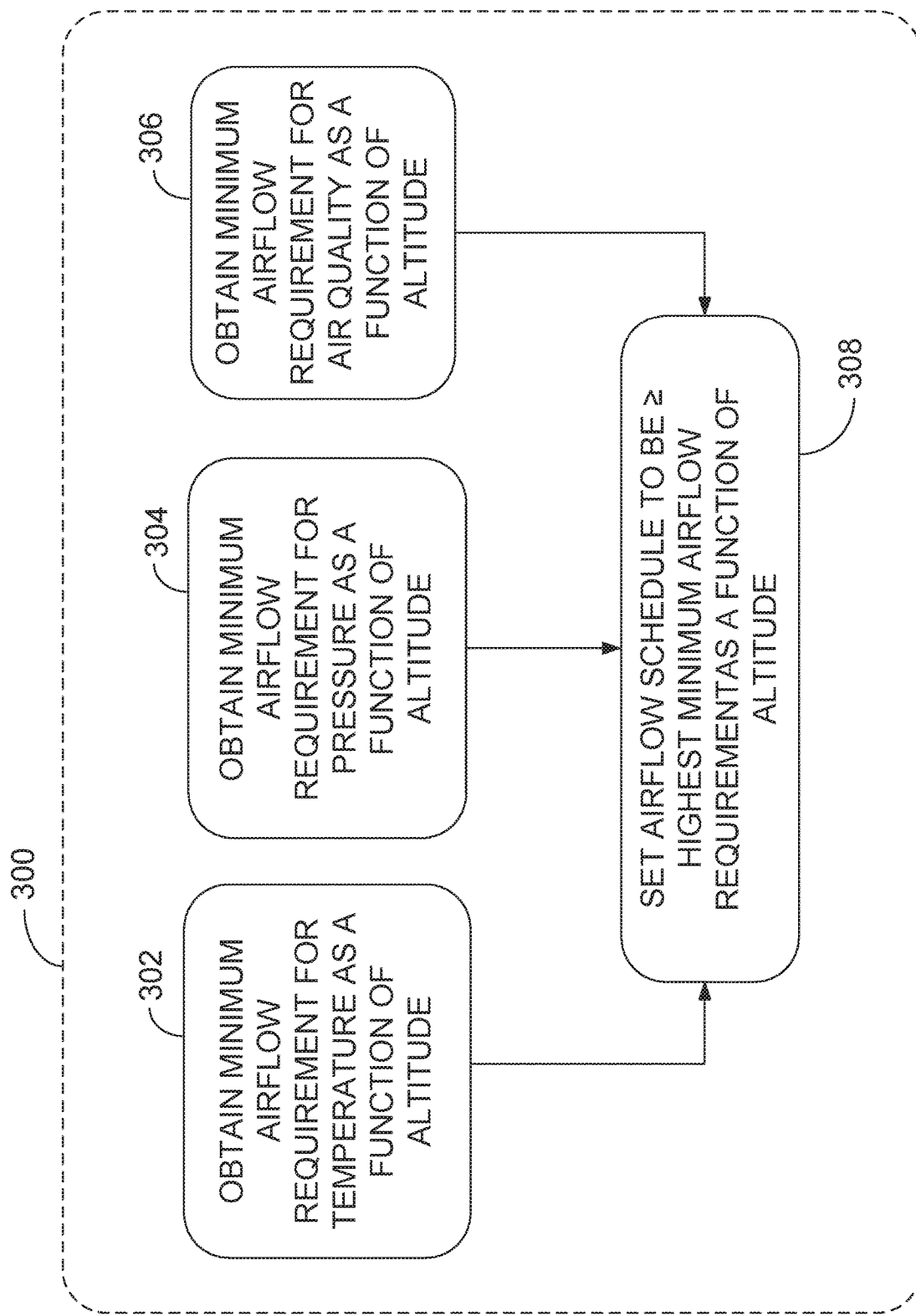
FIG. 3 is a flowchart of an exemplary method for managing airflow in an aircraft cabin.

An exemplary method for managing the airflow in the aircraft is illustrated in the flowchart 300 of FIG. 3. Steps 302, 304, and 306 refer to obtaining the minimum airflow requirements for temperature, pressure, and air quality as a function of the altitude of the aircraft or cabin. The ambient temperature outside the airplane, number of cabin occupants, selection of cabin internal temperature, and air quality monitoring are other parameters that may be used to manage the airflow in the aircraft. In some embodiments, obtaining the minimum airflow requirements may simply involve receiving values from another source. For example, the values may be received from another device that interfaces or interacts with the air management system. The other device may be, for example, an environmental control system (ECS) controller, an engine-indicating and crew-alerting system (EICAS), or a Flight Management System (FMS). The other device may also be a cabin air quality monitoring system that monitors the quality of recirculated air and other sources). Any other existing aircraft system or instrumentation that would provide appropriate input to the air management system 112 to determine in real time the adjusted airflow schedule may also be used. In some embodiments, when certified and approved by airworthiness authorities, the other device may be a remote device, such as a portable computer or smart phone handled by aircraft crew/pilot, that can interact wirelessly with the aircraft management system 112. The values may have been determined by the other device or the other device may act as an intermediary for transmitting the values from yet another source. Alternatively, the values may be input by a user via a graphical user interface (GUI) provided on the air management system 112, on the other device, or on a third device which communicates with the other device.

In some embodiments, obtaining the minimum airflow requirements may comprise determining one or more of the minimum airflow requirements using input data. Input data may comprise sensor data obtained from various sensors such as temperature sensors, pressure sensors, air quality sensors, and other types of sensors from which data used to determine the minimum airflow requirements for any one of temperature, cabin pressure, and air quality may be derived. Other input data may comprise occupancy data for the aircraft, such as actual occupancy or maximum occupancy specified for the given aircraft. Input data may comprise fresh air requirements imposed by various regulatory bodies, a defined ratio of fresh air to recirculated air, a minimum fresh air component per passenger/crew member, and/or a minimum fresh air component in case of failure of the air management system or other aircraft systems. Input data may also comprise actual operating data of the aircraft or aircraft specification data. The air management system 112 may be configured to determine the minimum requirements for any one of temperature, cabin pressure, and air quality/ventilation based on the input data.

As per step 308, the airflow schedule may be set to be greater than or equal to the highest one of the temperature, pressure, and air quality minimum airflow requirements, as a function of the altitude of the aircraft or cabin. The ambient temperature outside the airplane, number of cabin occupants, selection of cabin internal temperature, and air quality monitoring may also be used to set the airflow schedule. In some embodiments, the air management system 112 is configured to set the airflow schedule before the flight or at the beginning of the flight. For example, the minimum airflow requirements for temperature, pressure, and air quality are provided to the system 112 upon start-up of the aircraft and the airflow schedule is set using various configuration parameters. Airflow is varied as a function of a current aircraft or cabin altitude but the set value of airflow for any given altitude is determined before the flight begins.

In some embodiments, the airflow schedule may be set dynamically throughout the flight, using a current altitude and other parameters obtained in real time. For example, outside temperature (or atmospheric conditions) may be sensed in real time and it may be used to determine, at any given time during the flight, the minimum airflow requirements for heating and cooling of the aircraft. Actual temperature feedback from the cabin to determine heating or cooling needs may also be considered. As these values are determined, the airflow schedule may automatically adjust to remain greater than or equal to the highest one of the temperature, pressure, and air quality minimum airflow requirements, as a function of the current altitude of the aircraft. Similarly, actual pressurization needs may be determined in real time and the airflow schedule may automatically adjust to the determined pressure.

Other factors may also be used to dynamically set the airflow schedule. For example, performance of the engine or another component of the aircraft may be taken into account. In a situation where there is an opportunity to conserve fuel or power by limiting the bleed or power off take from a power source, the airflow may be modified accordingly. Modification of the airflow may involve increasing or lowering total airflow, or it may involve changing the ratio of fresh air to recirculated air. The actual quality of the air in the cabin or at other locations within the aircraft ventilation system 102 may also be used. Air quality may be determined in real time using sensors placed at one or more locations in the aircraft.

Figure 4:
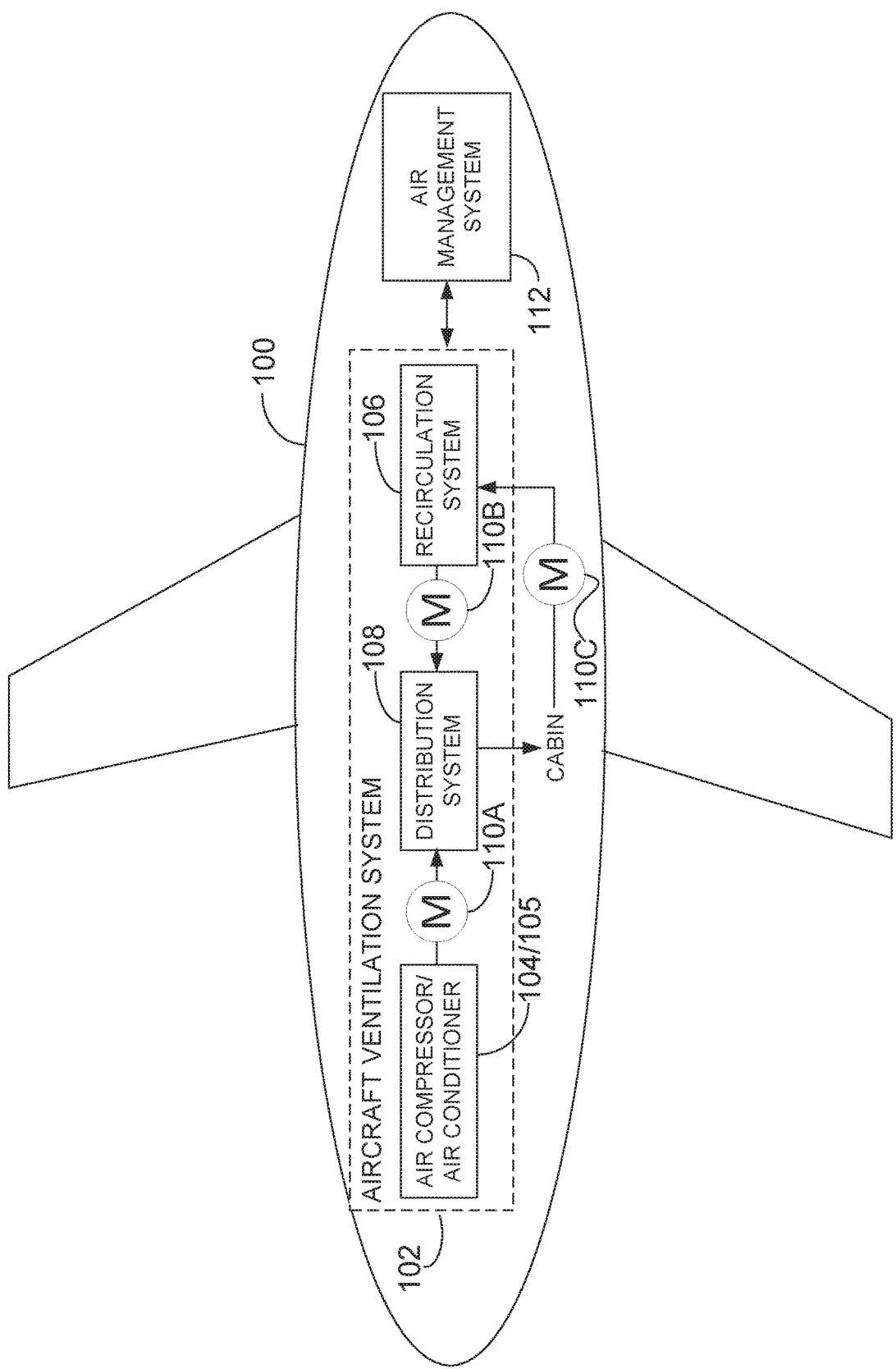
FIG. 4 illustrates an exemplary embodiment of the aircraft with air quality sensors provided therein.

FIG. 4 is an exemplary embodiment of the aircraft 100 with sensors 110a, 110b, 110c (collectively referred to as 110) provided therein for sensing air quality. In this example, air quality is sensed in multiple air flow passages between the ventilation system 102 and the cabin. These air flow passages may be between the air compressor 104/105 and the distribution system 108 and between the recirculation system 106 and the distribution system 108. Alternatively, a single sensor, such as sensor 110c in the cabin, may be provided to determine air quality therein. As per FIG. 4, a first sensor 110a may be provided between the air compressor 104 and the distribution system 108 to monitor the air quality therebetween. A second sensor 110b may be provided between the recirculation system 106 and the distribution system 108 to monitor the air quality therebetween. Sensors 110a, 110b may comprise an array of sensors for identifying concentration levels of predefined airborne contaminants possibly existing in the respective inlet air flows. They may be positioned anywhere along the inlet air flows between the air sources 104, 106, and the cabin.

The air management system 112 may receive from the sensors 110a, 110b concentration levels of targeted volatile organic compounds (VOCs) or other potential contaminants to the air in the aircraft. The sensors 110a, 110b may thus be VOC sensors or other air contaminant sensors, capable of detecting ppm concentrations of various contaminants such as ozone, carbon monoxide, carbon dioxide, nitrogen dioxide, sulfur dioxide, and particulate matter. For example, the sensors 110a, 110b, may be heating semiconductor, non-dispersive infrared, and/or light emitting diode sensors; they may be based on Nano-electro-mechanical systems (NEMS) and/or wireless sensor network (WSN) technology. The sensors 110a, 110b may be selected as a function of desired characteristics, such as size, accuracy, power consumption, and ability to detect one or more of the targeted air contaminants.

The air management system 112, upon receipt of sensor data, may compare air contaminant concentration levels to one or more thresholds and modify the airflow in the cabin accordingly. For example, the ratio of fresh air to recirculated air may be modified in an attempt to increase the fresh air component, so as to increase air quality. Or as another example, the fresh air component may be reduced similarly, if the air quality is sufficiently above the targeted air quality level, thus allowing potential energy/fuel SFC savings. The reduction of fresh air flow may be compensated by an increase of recirculated air, to maintain a targeted ventilation rate.

In some embodiments, the air management system 112 may determine the need to advise a flight crew of an anomaly with regards to cabin air quality. For example, an alert signal may be triggered when the air quality is found to be at an unacceptable level or at a level that is below optimal. There may be a single level that triggers the alert, or there may be multiple levels. The alert signal may be transmitted to the crew via a dedicated graphical user interface (GUI) provided for the flight crew, namely the pilot(s) and/or flight attendants. For example, an indicator may be provided directly on an instrument panel in the cockpit or flight deck to signal a problem with the air quality. Alternatively, the air management system 112 may interface with existing aircraft equipment, such as EICAS, the controller that manages functionalities of the aircraft pneumatics system, or other systems instrumentation, and the alert signal may be displayed on a GUI of the existing aircraft equipment.

In some embodiments, the air management system 112 is configured to determine, from the sensor data, a location within the aircraft ventilation system 102 which may be the source of the air contaminant. For example, data received from sensor 110a may indicate that the bleed air from the air compressor 104 is unacceptably contaminated while data received from sensor 110b may indicate that air provided by the recirculation system 106 is not contaminated beyond acceptable limits. Other sensors may also be added within the aircraft ventilation system 102 in order to more specifically identify the source of the air contamination. For example, sensor 110c may be provided between the cabin and the recirculation system 106. The air management system 112 may therefore make a distinction between the quality of air entering the recirculation system 106 vs the quality of air exiting the recirculation system 106, thus determining if the problem is within the recirculation system 106 itself. Comparison of sensor data from multiple sensors may be used to pinpoint the source of the problem.

In some embodiments, the air management system 112 may also determine which corrective action may be taken in response to a determination that air quality is unacceptable or below optimal. For example on the ground, either one of the air compressor 104 or recirculation system 106 may be shut down and air distribution may rely only on the remaining active one of the air compressor 104 or recirculation system 106. This corrective action may be used, for example, if it is determined that outside air passing through the air compressor 104 or air conditioning 105 is contaminated, or that one of the engines has a contaminant emission, or that filtered air from the recirculation system 106 is contaminated. In another example, the ratio of compressed air to recirculated air may be varied to account for a reduced quality in any one of the air sources. Other examples of corrective actions are to activate an inactive air source or to recommend a maintenance (general or specific) to the aircraft ventilation system 102.

In some embodiments, the air management system 112 is configured to display the corrective action to be taken on a GUI to the flight crew. Alternatively, the air management system 112 may be configured to automatically apply the corrective action, depending on the nature of the corrective action. For example, a need for maintenance would simply be displayed while a change in a ratio of compressed air to recirculated air may be performed automatically. The air management system 112 may thus be operatively connected to the aircraft ventilation system 102 for opening and closing various inlet and outlet valves, shutting down and turning on air sources in the air compressor 104, air conditioning 105 or the recirculation system 106, and providing command signals to the distribution system 108 for control of air flow to the cabin. Control may be effected via command signals transmitted through the existing aircraft wiring harnesses and cable assemblies, through dedicated wiring/cabling, through a wireless network, or through a combination thereof. The wireless network may operate using RF, infrared, Wi-Fi, Bluetooth, or other wireless technologies.

Figure 5:
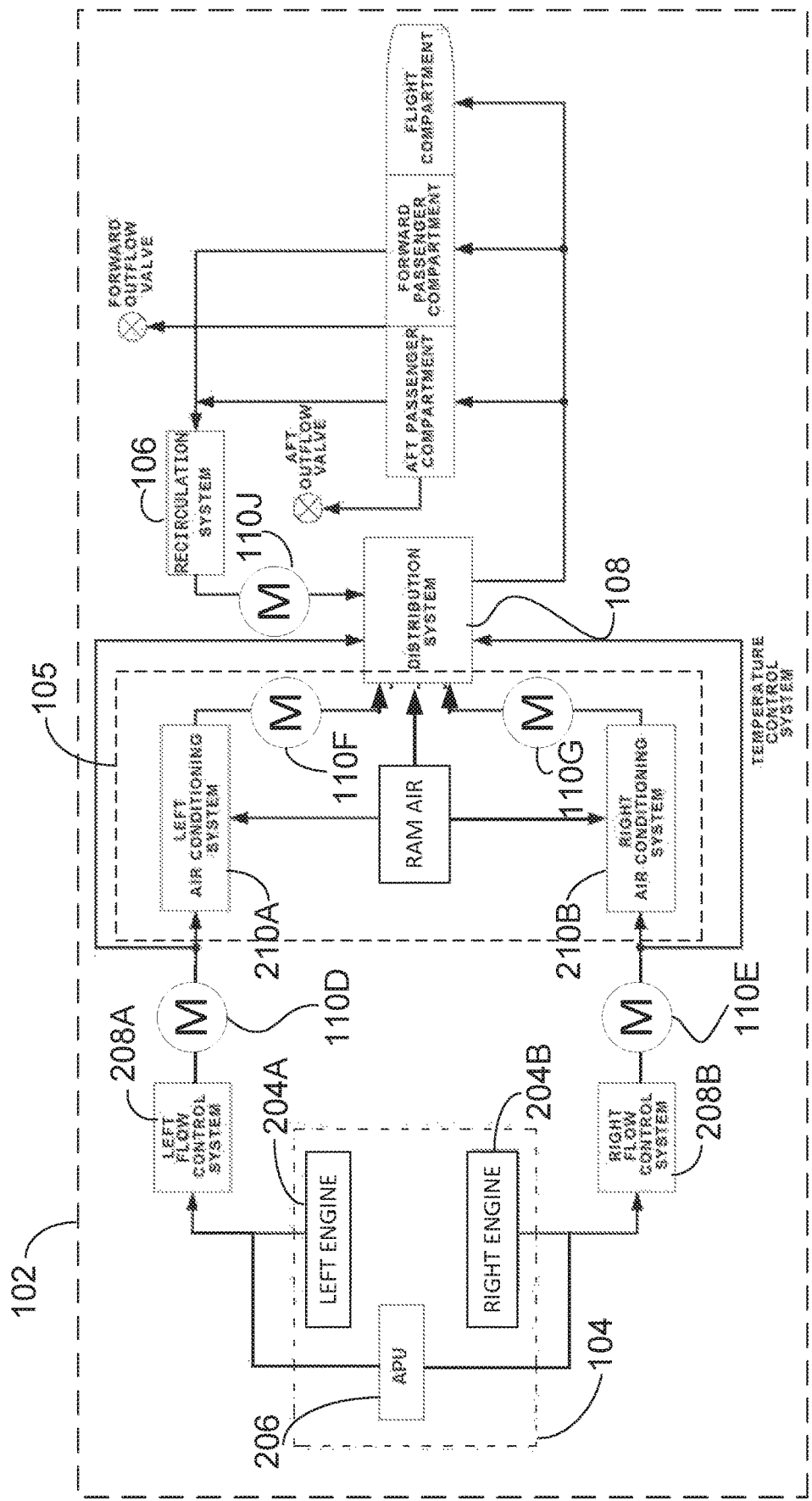
FIG. 5 illustrates an exemplary embodiment of an aircraft ventilation system with sensors provided therein.

FIG. 5 is a more detailed example of the aircraft ventilation system 102, in accordance with one embodiment. In this example, the air compressor 104 comprises a left engine 204a, a right engine 204b, and an APU 206. Compressed air from the left engine 204a and/or APU 206 flows through a left flow control system 208a and a left air conditioning system 210a before reaching the distribution system 108. Compressed air from the right engine 204b and/or APU 206 flows through a right flow control system 208b and a right air conditioning system 210b before reaching the distribution system 108. A plurality of sensors 110d, 110e, 110f, 110g, 110h, 110j are provided throughout the system 102 for collecting sensor data and transmitting the sensor data to the air management system 112.

Figure 6:
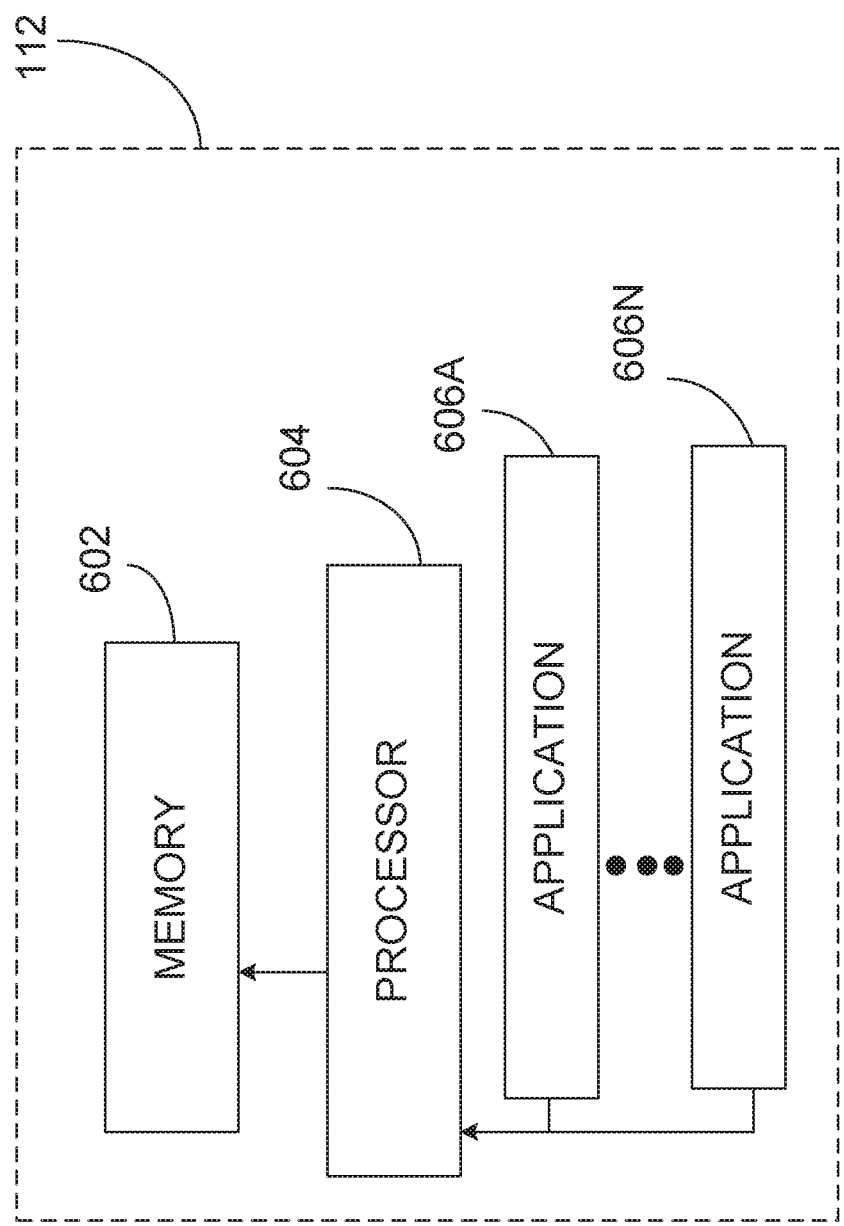
FIG. 6 is a block diagram of an exemplary embodiment of the air management system.

Referring to FIG. 6, there is illustrated an exemplary embodiment of the air management system 112, which comprises, amongst other things, a plurality of applications 606a . . . 606n running on a processor 604 coupled to a memory 602. It should be understood that while the applications 606a . . . 606n presented herein are illustrated and described as separate entities, they may be combined or separated in a variety of ways. The memory 602 accessible by the processor 604 may receive and store data. The memory 602 may be a main memory, such as a high speed Random Access Memory (RAM), or an auxiliary storage unit, such as a hard disk, a floppy disk, or a magnetic tape drive. The memory 602 may be any other type of memory, such as a Read-Only Memory (ROM), or optical storage media such as a videodisc and a compact disc. The memory 602 illustratively has stored therein any one of minimum airflow requirements for temperature, minimum airflow requirements for pressure, minimum airflow requirements for air quality, airflow schedules, aircraft specification data, occupancy data, sensor data, and corrective actions.

The processor 604 may access the memory 602 to retrieve data. The processor 604 may be any device that can perform operations on data. Examples are a central processing unit (CPU), a front-end processor, a microprocessor, and a network processor. The applications 606a . . . 606n are coupled to the processor 604 and configured to perform various tasks.

In some embodiments, the air management system 112 is a downloaded software application, a firmware application, or a combination thereof on an existing aircraft system. Alternatively, dedicated hardware may be provided for the air management system 112 and connected to the aircraft for communication with the sensors 110, the aircraft ventilation system 102, and any other equipment and/or system onboard with which it is to interface. In some embodiments, the air management system 112 is remotely accessible via a device such as a personal computer, a tablet, a smartphone, or the like, via a wired or wireless connection. In some embodiments, the air management system 112 may itself be provided directly on one of the devices, either as a downloaded software application, a firmware application, or a combination thereof.

Figure 7:
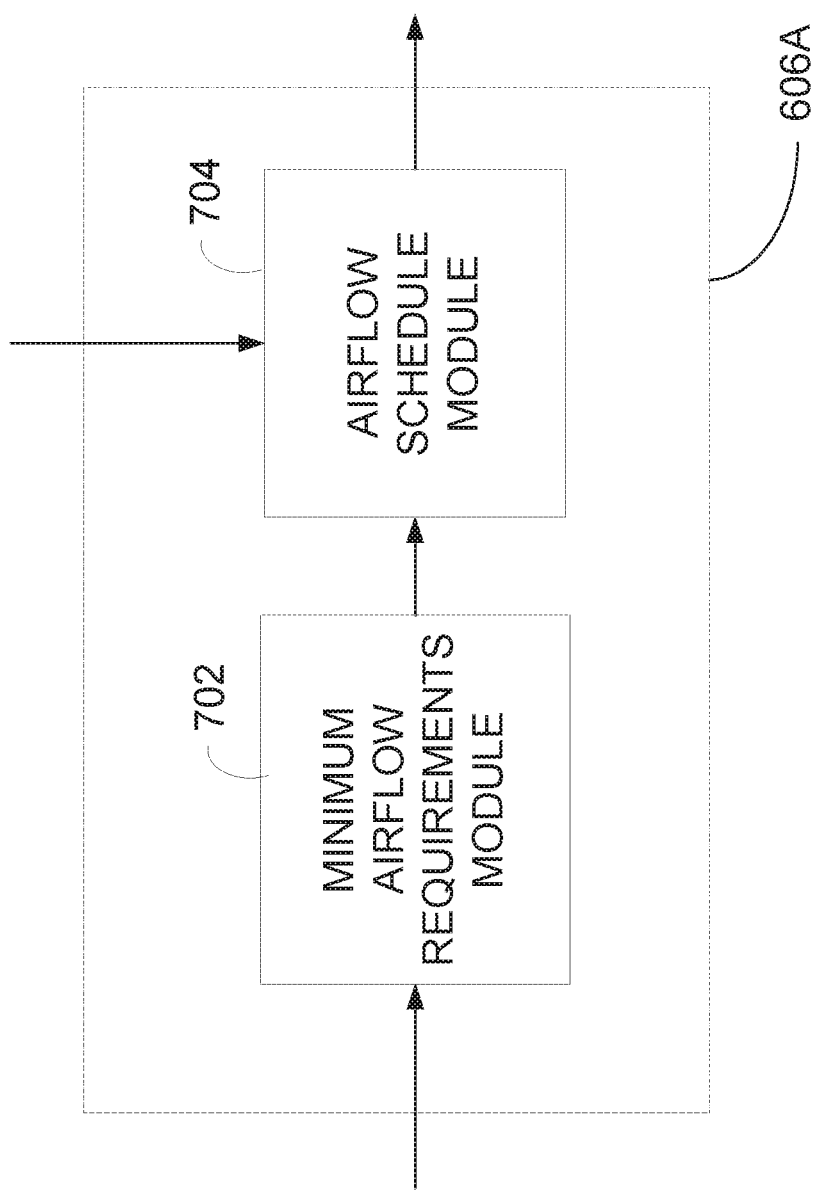
FIG. 7 is a block diagram of an exemplary application running on a processor of the air management system.

FIG. 7 is an exemplary embodiment of an application 606a running on the processor 604. The application 606a illustratively comprises a minimum airflow requirements module 702 and an airflow schedule module 704. The requirements module 702 is configured to obtain the minimum airflow requirements for temperature, pressure, and air quality, either through direct reception or by determining the requirements based on received input data and/or sensor data. Requirements may be determined dynamically throughout the flight or once before the flight begins. The airflow schedule module 704 may be configured to set the airflow schedule as a function of airflow needs in the cabin, using the minimum requirements received from the requirements module 702 and any other relevant data, such as current aircraft altitude, sensed air quality information, and other conditions or requirements for setting the airflow schedule. In some embodiments, the airflow schedule module 704 is configured to dynamically vary the airflow schedule as a function of changing conditions inside and/or outside of the aircraft.

Figure 8:
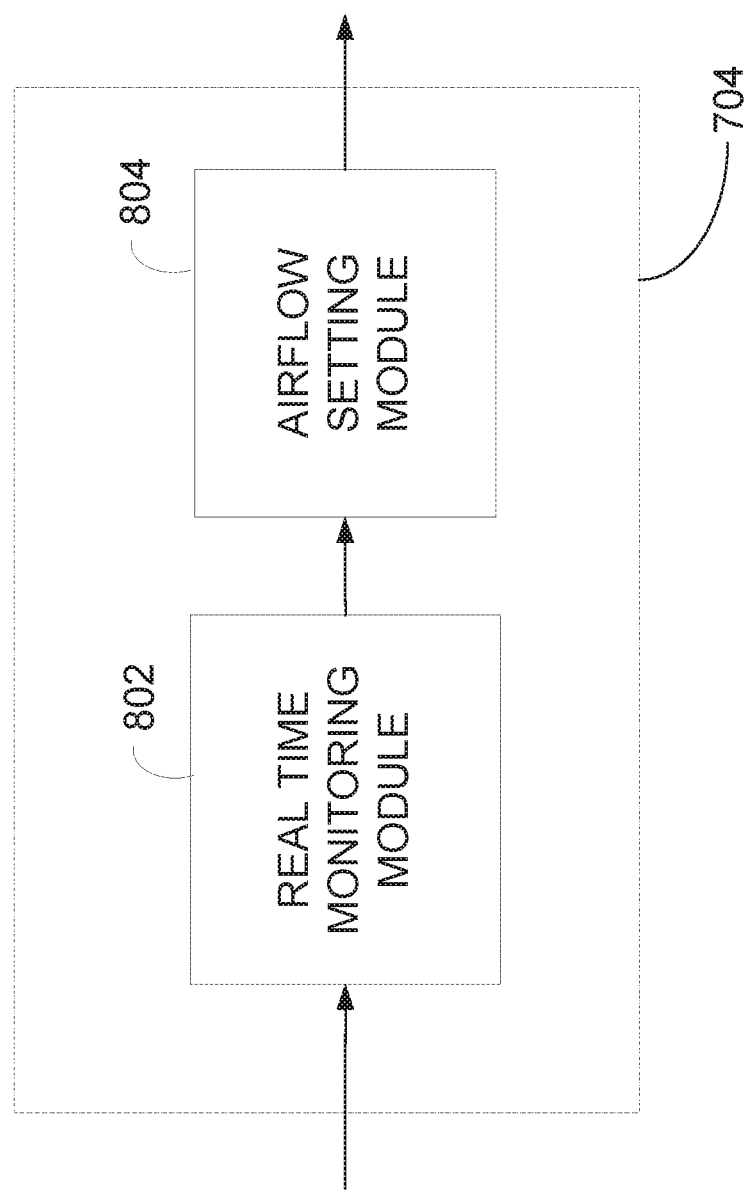
FIG. 8 is a block diagram of an exemplary embodiment of an airflow schedule module.

In embodiments where the airflow schedule module 704 dynamically varies the airflow schedule as a function of changing conditions, it may be separated into a real time monitoring module 802 and an airflow setting module 804, as per FIG. 8. The real time monitoring module 802 may be configured to perform air quality monitoring in real time, in any one of a passive, an active, and an active control mode. In passive mode, the real time monitoring module 802 may trigger an alert signal if any concentration level of the sensed air flow passages are above or below a given threshold. The alert signal may comprise a location for the possible contamination within the aircraft 100. In active mode, the real time monitoring module 802 may provide a recommended corrective action or operational task to address detected concentration levels above or below given thresholds. The recommended corrective actions may be displayed for the flight crew as soon as the issue is detected. In active control mode, the real time monitoring module 802 may automatically perform some of the corrective actions, such as shutting down one or more air source, activating one or more air source, and varying a ratio of compressed air to recirculated air that is distributed within the aircraft cabin.

The real time monitoring module 802 may also be configured to monitor other conditions inside and/or outside of the aircraft, such as temperature, air density, differential pressure, and any other influencing factor for the setting of the airflow schedule. The airflow setting module 804 may be coupled to the real time monitoring module 802 for receiving real time data, such as sensor data and/or concentration measurements therefrom. It may be configured for dynamically setting the airflow in the cabin as a function of the received data.

It will be understood that the real time monitoring module 802 and the airflow setting module 804 may be provided as a single module that can perform both real time monitoring and airflow setting functions. Similarly, these two functions may be provided in separate applications 606a, 606n, that run separately on the processor 604. Also alternatively, the two functions may be provided in separate applications that run on separate processors. Other alternative configurations for the software/hardware architecture of the air management system 112 will be readily understood by those skilled in the art. The above description is meant to be exemplary only, and one skilled in the relevant arts will recognize that changes may be made to the embodiments described without departing from the scope of the invention disclosed. For example, the blocks and/or operations in the flowcharts and drawings described herein are for purposes of example only. There may be many variations to these blocks and/or operations without departing from the teachings of the present disclosure. For instance, the blocks may be performed in a differing order, or blocks may be added, deleted, or modified.

While illustrated in the block diagrams as groups of discrete components communicating with each other via distinct data signal connections, it will be understood by those skilled in the art that the present embodiments are provided by a combination of hardware and software components, with some components being implemented by a given function or operation of a hardware or software system, and many of the data paths illustrated being implemented by data communication within a computer application or operating system. The structure illustrated is thus provided for efficiency of teaching the present embodiment. The present disclosure may be embodied in other specific forms without departing from the subject matter of the claims. Also, one skilled in the relevant arts will appreciate that while the systems, methods and computer readable mediums disclosed and shown herein may comprise a specific number of elements/components, the systems, methods and computer readable mediums may be modified to include additional or fewer of such elements/components. The present disclosure is also intended to cover and embrace all suitable changes in technology. Modifications which fall within the scope of the present invention will be apparent to those skilled in the art, in light of a review of this disclosure, and such modifications are intended to fall within the appended claims.

The invention claimed is:

1. A method for controlling airflow in an aircraft, the method comprising:
   obtaining a minimum airflow for attaining a target temperature in the aircraft as a function of altitude of the aircraft or cabin;
   obtaining a minimum airflow for attaining a target cabin pressure in the aircraft as a function of the altitude of the aircraft or cabin;
   obtaining a minimum airflow for attaining a target ratio of fresh outside ambient air to recirculated air, the ratio of fresh outside ambient air to recirculated air defining an air quality for the aircraft;
   when the minimum airflow for attaining the target temperature is greater than the minimum airflow for attaining the target cabin pressure and the minimum airflow for attaining the target ratio of fresh outside ambient air to recirculated air, controlling the airflow in the aircraft or cabin to be greater than the minimum airflow for attaining the target temperature;
   when the minimum airflow for attaining the target cabin pressure is greater than the minimum airflow for attaining the target temperature and the minimum airflow for attaining the target ratio of fresh outside ambient air to recirculated air, controlling the airflow in the aircraft or cabin to be greater than the minimum airflow for attaining the target cabin pressure; and
   when the minimum airflow for attaining the target ratio of fresh outside ambient air to recirculated air is greater than the minimum airflow for attaining the target cabin pressure and the minimum airflow for attaining the target temperature, controlling the airflow in the aircraft or cabin to be greater than the minimum airflow for attaining the target ratio of fresh outside ambient air to recirculated air.

2. The method of claim 1, further comprising:
   determining a current altitude of the aircraft or cabin; and
   varying the airflow in the cabin as a function of the current altitude.

3. The method of claim 1, wherein obtaining a minimum airflow for attaining a target temperature comprises:
   obtaining a minimum airflow for heating of the aircraft; and
   obtaining a minimum airflow for cooling of the aircraft.

4. The method of claim 1, wherein obtaining a minimum airflow for attaining a target ratio of fresh outside ambient air to recirculated air comprises determining a minimum airflow for attaining the target ratio of fresh outside ambient air to recirculated air using an actual occupancy of the aircraft.

5. The method of claim 1, wherein obtaining a minimum airflow for attaining the target temperature comprises determining the temperature minimum airflow using atmospheric conditions outside of the aircraft.

6. The method of claim 1, wherein controlling airflow comprises dynamically setting an airflow schedule using a current aircraft altitude and other parameters obtained in real time.

7. The method of claim 1, further comprising monitoring the ratio of fresh outside ambient air to recirculated air in the aircraft.

8. The method of claim 7, further comprising:
   detecting a drop in the ratio of fresh outside ambient air to recirculated air below a threshold; and
   triggering an alert signal indicative of the drop in the ratio of fresh outside ambient air to recirculated air.

9. The method of claim 8, further comprising modifying the airflow as a function of the drop in the ratio of fresh outside ambient air to recirculated air.

10. The method of claim 9, wherein modifying the airflow comprises at least one of shutting down at least one air source, shutting down a recirculation system, turning on a new air source, changing the ratio of fresh air to recirculated air distributed in the aircraft, and reducing a total air flow.

11. A system for controlling airflow in an aircraft, the system comprising:
   a memory;
   a processor coupled to the memory; and
   an application stored on the memory and comprising program code executable by the processor for:
      obtaining a minimum airflow for attaining a target temperature in the aircraft as a function of altitude of the aircraft or cabin;
      obtaining a minimum airflow for attaining a target cabin pressure in the aircraft as a function of the altitude of the aircraft or cabin;
      obtaining a minimum airflow for attaining a target ratio of fresh outside ambient air to recirculated air, the ratio of fresh outside ambient air to recirculated air defining an air quality for the aircraft;
      when the minimum airflow for attaining the target temperature is greater than the minimum airflow for attaining the target cabin pressure and the minimum airflow for attaining the target ratio of fresh outside ambient air to recirculated air, controlling the airflow in the aircraft or cabin to be greater than the minimum airflow for attaining the target temperature;

when the minimum airflow for attaining the target cabin pressure is greater than the minimum airflow for attaining the target temperature and the minimum airflow for attaining the target ratio of fresh outside ambient air to recirculated air, controlling the airflow in the aircraft or cabin to be greater than the minimum airflow for attaining the target cabin pressure; and when the minimum airflow for attaining the target ratio of fresh outside ambient air to recirculated air is greater than the minimum airflow for attaining the target cabin pressure and the minimum airflow for attaining the target temperature, controlling the airflow in the aircraft or cabin to be greater than the minimum airflow for attaining the target ratio of fresh outside ambient air to recirculated air.

12. The system of claim 11, wherein the application further comprises program code executable by the processor for:
determining a current altitude of the aircraft; and
varying the airflow in the cabin as a function of the current altitude.

13. The system of claim 11, wherein obtaining a minimum airflow for attaining a target temperature comprises:
obtaining a minimum airflow for heating of the aircraft; and
obtaining a minimum airflow for cooling of the aircraft.

14. The system of claim 11, wherein obtaining a minimum airflow for attaining a target ratio of fresh outside ambient air to recirculated air comprises determining a minimum airflow for attaining the target ratio of fresh outside ambient air to recirculated air using an actual occupancy of the aircraft.

15. The system of claim 11, wherein obtaining a minimum airflow for attaining the target temperature comprises determining the temperature minimum airflow using atmospheric conditions outside of the aircraft.

16. The system of claim 11, wherein controlling airflow comprises dynamically setting an airflow schedule using a current aircraft altitude and other parameters obtained in real time.

17. The system of claim 11, further comprising monitoring the ratio of fresh outside ambient air to recirculated air in the aircraft.

18. The system of claim 17, wherein the application further comprises program code executable by the processor for:
detecting a drop in the ratio of fresh outside ambient air to recirculated air below a threshold; and
triggering an alert signal indicative of the drop in the ratio of fresh outside ambient air to recirculated air.

19. The system of claim 18, further comprising modifying the airflow as a function of the drop in the ratio of fresh outside ambient air to recirculated air.

20. The system of claim 19, wherein modifying the airflow comprises at least one of shutting down at least one air source, shutting down a recirculation system, turning on a new air source, changing the ratio of fresh air to recirculated air distributed in the aircraft, and reducing a total air flow.

* * * * *